April 13, 1926.
H. MORGAN
REAPING MACHINE
Filed April 12, 1924
1,580,668
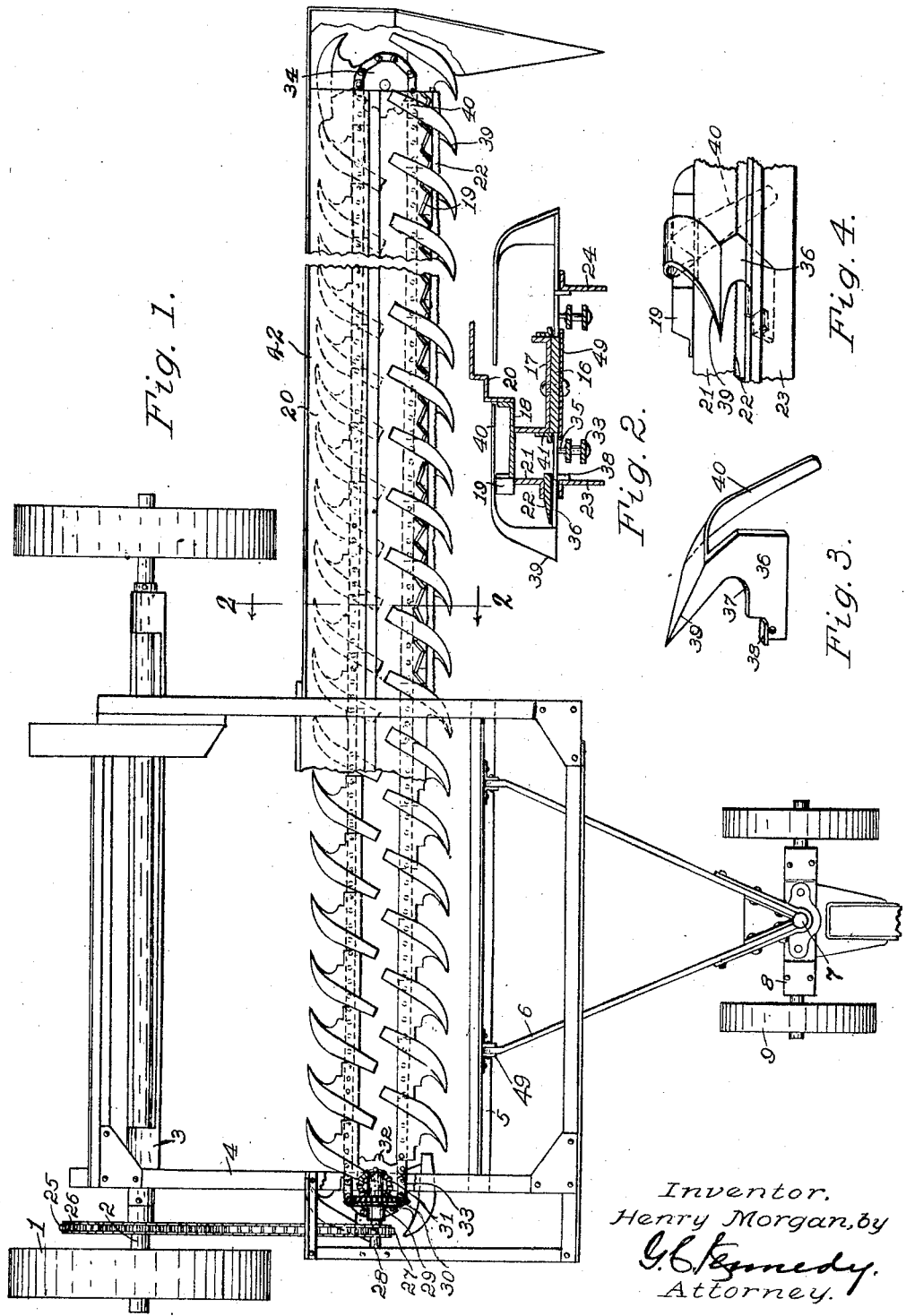
Inventor.
Henry Morgan, by
G.C. Kennedy.
Attorney.

Patented Apr. 13, 1926.

1,580,668

UNITED STATES PATENT OFFICE.

HENRY MORGAN, OF CEDAR FALLS, IOWA, ASSIGNOR OF ONE-THIRD TO CHARLES LEE OSTRANDER, OF WATERLOO, IOWA, AND ONE-THIRD TO CLARENCE H. WISE, OF CEDAR FALLS, IOWA.

REAPING MACHINE.

Application filed April 12, 1924. Serial No. 705,991.

*To all whom it may concern:*

Be it known that I, HENRY MORGAN, citizen of the United States, residing at Cedar Falls, in the county of Black Hawk and State of Iowa, have invented certain new and useful Improvements in Reaping Machines, of which the following is a specification.

My invention relates to improvements in reaping machines, and the object of my improvement is to supply such a machine with a relatively fixed sickle element, and with an endless carrying and propelling device about and auxiliary to the sickle and adapted to receive and drag the stems of grain or the like in separated parts across the sickle to sever the stems, while then alining the stems and moving them to a place of deposit and delivery to a binder or other device.

This object I have accomplished by the means which are hereinafter described and claimed, and which are illustrated in the accompanying drawings, it being understood that changes in the precise embodiment of invention herein disclosed can be made within the scope of what is claimed without departing from the spirit of the invention.

In said drawings:

Fig. 1 is a top plan of my improved reaping machine, with parts removed or broken away. Fig. 2 is a cross section taken on the broken line 2—2 of Fig. 1, on a larger scale, of the reaping mechanism including the fixed sickle and the endless propelling device. Fig. 3 is a perspective view of one of the propelling elements of said device as separated from its associated mechanism. Fig. 4 is a fragmentary perspective detail view of one of said propelling elements associated with some of the reaping members and supports.

A sub-frame 3 is mounted on a shaft 2 upon whose ends are fixed a pair of ground wheels 1. A top frame 4 is rigidly supported on the sub-frame, while the front cross-bar 5 of this sub-frame has spaced apertured lugs between which are pivoted the rear ends of a forwardly projecting V-shaped traction device 6. The apex of this device is pivotally connected to an upright pin 7 on a cross-beam or member 8 in which the axle of a pair of smaller ground wheels 9 is rotatably mounted.

A supporting structure for the reaping mechanism is rigidly mounted transversely across the sub-frame forwardly of the axle or shaft 2 medial of the sub-frame as shown, or if desired may be positioned more forwardly to be at or about the front of the sub-frame. As shown in said Fig. 2 this supporting structure includes spaced angle-bars 23 and 24 and a medially located bar or plate 16, which are bolted or otherwise fastened rigidly to the sub-frame. Upon the bar or plate 16 is secured a channeled plate 17, and this together with another angle-bar 21 spaced above the forward angle-bar 23 carry one platform member 18 to which is fixed as by welding or otherwise a more elevated platform member 20. The forward longitudinal marginal part of the member 18 is shaped with raised angular projections 19 with angles to the front. The sickle-blade 22 is fastened rigidly upon the under face of said angle-bar 21 spaced a little above the lower front angle-bar 23.

Upon the lower end of an erect rotatable shaft 30 mounted on the sub-frame is fixed a driving sprocket-wheel 32. At the outer extremity of the supporting plate 16 is rotatably mounted an idler-sprocket 34, and a sprocket-chain 33 is passed about and meshed with said sprocket-wheels.

Upon the upper end of the vertical shaft 30 is fixed a bevel-pinion 31 in mesh with a bevel-gear 29, the latter mounted on a short shaft 28, and on the latter shaft is also fixed a sprocket-wheel 27, a sprocket-chain 26 connecting the latter with a larger sprocket-wheel 25 fixed on the driving axle 2. It will be observed that when the apparatus is drawn forwardly, the said driving-connections cause the sprocket-chain 33 to move in one direction, to propel the forward reach thereof from the idler 34 toward the sprocket 32.

I have provided a plurality of grain propelling members 36 arranged regularly along the sprocket-chain 33 to cooperate with the sickle 22 in the cutting and moving of the cut grain upon and along the platform members 18—20.

Referring to Figs. 2 to 4, each member 36 is in body a flat plate cut away or narrowed at one end and incised to provide a bent over lug 38. This plate close to said lug has on its under face a fixed pin 35 which is fixed to a link of the sprocket-chain 33 below. The plate part 36 is placed horizontally within the interspace of the sickle 22 and the lower angle-bar 23 to project forwardly of the angle-bar and sickle as shown in Fig. 2. The plate is shaped with a forwardly diminished part directed angularly at a curved recess 37 and diminished to a point at 39, with this inclined point at the forward reach of the sprocket-chain 33 directed inclinedly toward the direction of travel of the chain toward the place of delivery on said frame. The plate is then bent along an oblique line angularly upwardly and then curved inclinedly rearwardly and away from said line of travel, providing a diminished finger 40 which is positioned over and across the sickle 22 and over the angular projections 19 on the platform member 18 as also across said member obliquely nearly to the more elevated platform member 20. Upon opposite sides of the supporting channel-plate 17 are fixed angle-bars 41 just above the rearwardly projecting ends of the plates 36, while a plate 49 is secured upon and along the under face of the supporting plate 16 to have its longitudinal margins project under the same ends of said plate 36, whereby the said plate ends may travel loosely between the plate 49 and the angle-bars 41 to prevent vertical tilting, the lugs 38 on the plates 36 being stopped by the abutting angle-bars 23 and 24 to prevent horizontal deflections.

In operation, when the machine is drawn forward, the driving mechanism propels the sprocket-chain so that its forward reach together with the members 36 are moved toward the sprocket-wheel 32. The points 39 of said members separate from each other portions of the standing grain and push these portions along the serrated cutting edge of the sickle 22, so that the inclined rear edge of the point or projection 39 together with the rounded following edge 37 of each member draw the grain stems so that they are compressively pushed toward the sickle as the members 36 are progressively moved therealong. This insures severing of the stems, and as cut the butts of the reaped stems are drawn longitudinally relative to the sickle to fall and be drawn over upon the platform members 18—20, the inclined fingers 40 directing the stems upon the platform in part aided by the dragging friction thereagainst of the angular projections 19.

Having described my invention, what I claim as new, and desire to secure by Letters Patent, is:

1. In a reaping machine, a sickle, driving means, and a device driven thereby along said sickle, having projections directed angularly relatively thereto and bent reversely across the sickle.

2. In a reaping machine, a relatively fixed sickle of elongated shape, driving means, and linked elements driven thereby, having fingers directed across the sickle at an oblique angle thereto.

3. In a reaping machine, driving means, a sickle, and a device longitudinally thereof and driven by said driving means, comprising movably-connected hooked elements whose hooks are concave at one side and project across the sickle.

4. In a reaping machine, a relatively fixed sickle, driving means, and a device consisting of connected hooked members driven thereby and projecting outwardly therefrom and then bent across the sickle with the forward reach of the device extending along the sickle, the bent parts thereof inclined in the direction of movement.

5. In a reaping machine, a relatively fixed sickle with a straight cutting edge, driving means, and an endless chain of propelling hooks driven thereby and positioned to have one reach movable longitudinally of the cutting edge of the sickle.

6. In a reaping machine, a relatively fixed sickle, driving means, and interlinked devices driven thereby along the sickle, having hooks provided with projections carried obliquely across the sickle.

7. In a reaping machine, a relatively fixed sickle, driving means, and interlinked devices driven thereby along the sickle, having bends with pointed hooks with inclined parts extending across the sickle and having concavities in their advancing shanks.

8. In a reaping machine, a relatively fixed sickle with relative minute serrations, driving means, and a sectional device driven thereby lengthwise of said serrated edge and whose sections are reversely bent to cross the sickle edge obliquely to project both forwardly and rearwardly of the sickle.

9. In a reaping machine, means for transportation, a relatively fixed sickle, an elongated support for the sickle mounted on said means for transportation, an elongated receiving platform mounted on said support to the rear of the sickle, an endless-chain device driven by said means for transportation and positioned below said support and having its front reach parallel with the sickle, and fingers mounted on said device to project forwardly of the sickle, thence bent upwardly and across it obliquely.

10. In a reaping machine, means for transportation, a sickle supported thereon, and connected relatively movable oblique concave and reversely bent fingers driven by said means for transportation lengthwise of the sickle.

In testimony whereof he affixes his signature.

Waterloo, Iowa, March 10, 1924.

HENRY MORGAN.